Patented Oct. 4, 1949

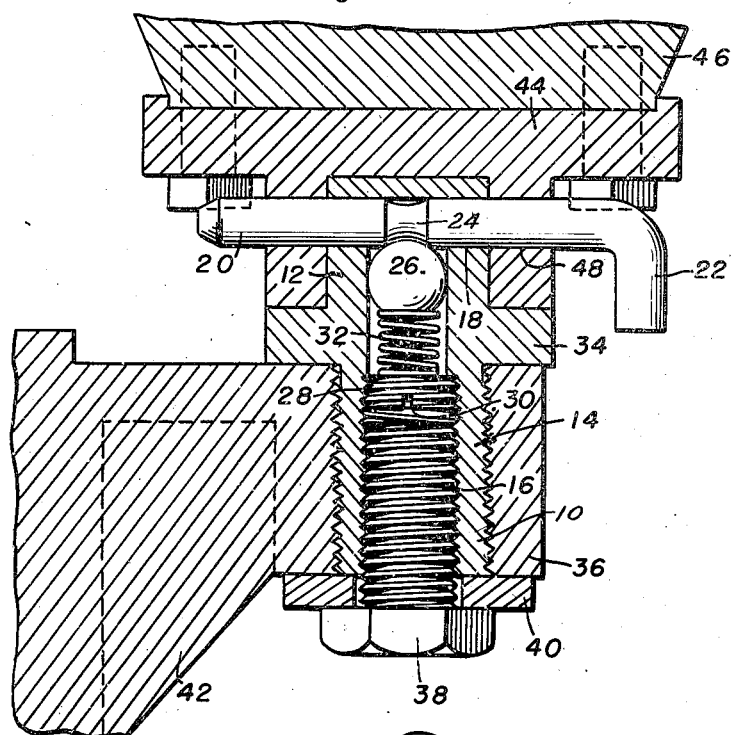
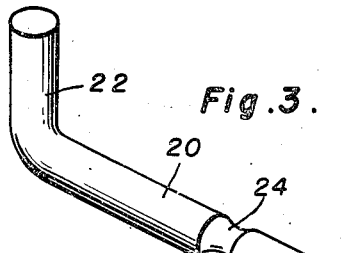
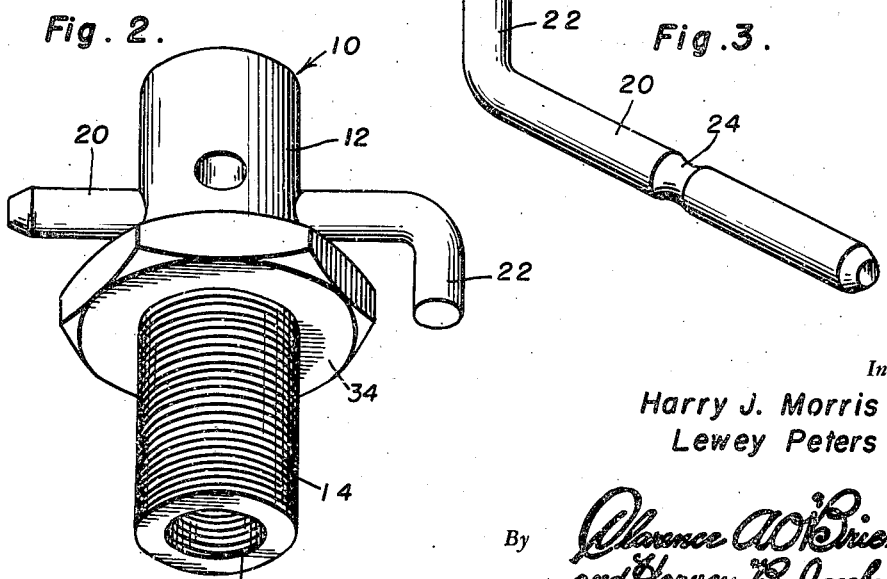
Inventors
Harry J. Morris
Lewey Peters

2,483,660

UNITED STATES PATENT OFFICE 2,483,660

ATTACHMENT FOR MOLD CARRIERS

Harry J. Morris and Lewey Peters, Okmulgee, Okla.

Application April 28, 1947, Serial No. 744,406

4 Claims. (Cl. 49—41)

This invention relates to new and useful improvements in mold carriers and more particularly to an attachment for mold carriers of machines used in the production of glass jars.

The primary object of the present invention is to provide a novel and improved attachment for the carrier arm of glass jar machines to conveniently suport the mold used with the machine in the production of glass jars.

Another important object of the present invention is to provide a device including resiliently biased coupling means for attachment of the device to the bottom plug retainer of a mold.

A further purpose of the present invention is to provide a mold carrier attachment embodying means for quickly and readily fastening the same to a carrier arm and mold or for removing the attachment from the said carrier arm and mold.

A still further aim of the present invention is to provide an attachment for mold carriers that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary sectional view showing the present invention applied to a carrier arm and supporting a mold;

Figure 2 is a perspective view of the present attachment for mold carriers; and, Figure 3 is a perspective view of the locking pin used in conjunction with the present invention.

In the production and manufacture of glass jars many systems are known, of which, the most universal method used is the conveyor system wherein glass jar molds are employed. The conveyor system is controlled by a machine that includes carrier arms which are connected to molds. The machine is so constructed as to rapidly conduct the molds in horizontal movement and vertical movement as the material within the molds becomes hardened to form glass jars.

Frequenty during the process of forming the glass jars it becomes necessary to remove the molds from the carrier arm during operation of the machine, for replacement, inspection or the like of the molds. The means now employed for connecting the molds to the carrier arms is inadequate for quick and ready removal of the molds from the carrier arms and also the means now employed frequently break during the rapid movement of the machine causing the mold and support to break under the stress, and damage the machine.

It is therefore the object of the present invention to provide a device removably secured to the carrier arm and supporting the mold in such a manner as to eliminate the foregoing difficulties in the production of glass jars.

Referring now to the drawings in detail, wherein for the purpose of illustration, there is disclosed a preferred embodiment of the present invention, the numeral 10 represents the mold carrier attachment generally. This device comprises a cylindrical sleeve 12 the lower portion of which is externally screw-threaded, as at 14, and the inner periphery of which is also screw-threaded, as at 16.

The upper portion of sleeve 12 is provided with a transverse aperture 18 through which extends the shank portion 20 of an angular locking pin 22. The shank portion is formed with an annular groove or recess 24 centrally disposed with the sleeve to frictionally engage a ball member 26.

Adjustably mounted within the sleeve 12 and engaging threads 16 is a plug 28 provided with a kerf 30 at its lower portion for the reception of any suitable tool for adjusting the plug in the sleeve.

Resiliently biased between plug 28 and ball member 26 is a coil spring 32 normally projecting the ball to engage recess 24 in the shank 20 for retaining the locking pin in its locked position.

Integrally formed with sleeve 12 is a hexagonal nut or the like 34 furnishing a flanged portion that bears on the upper surface of the eye end of a carrier arm 36 when the sleeve 12 is inserted into this eye end of the carrier arm.

In practical use of the device, the threaded portion 14 of the sleeve is fitted into the eye end of the carrier arm and a bolt 38 is fitted upwardly into the sleeve and bears against a washer 40 at the lower edge of the carrier arm, assuring positive attachment of the device to the carrier arm. The carrier arm is suitably secured to the mold carrier 42 of the machine (not shown) for movement of the carrier arm.

Bearing on the upper face of nut 34 is the lower edge of a bottom plug retainer 44 removably carried by a mold 46. The upper portion of the device 12 is inserted upwardly into the plug retainer.

The locking pin is then inserted through apertures 48 provided in the plug retainer opposing apertures 18 so that the end of shank 20 projects outwardly from the plug retainer and ball 36 engages the recess 24 for holding the pin 22 within the sleeve 12 and plug retainer 44.

By an outward pulling pressure on the locking pin the mold 46 and plug retainer 44 may be completely removed from the device facilitating convenient inspection of replacement of the mold.

Obviously plug 28 may be adjusted to increase or decrease tension of the spring 32 to prevent dislodgement of the pin 22 during rapid operation of the machine.

In view of the foregoing description taken in conjuction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

We claim:

1. An attachment for mold carriers having a carrier arm, said attachment comprising a connector between a mold and the carrier arm, a locking pin securing the connector to the mold, and having an annular groove, a ball carried by the connector for seating in the groove, spring means holding the ball in seated position, adjusting means for said spring means and means removably securing said connector to said carrier arm.

2. An attachment for mold carriers having a carrier arm provided with an internally threaded opening, said attachment comprising a cylindrical member having a threaded end portion receivably engaging the opening in the carrier arm, a flange integrally formed with said member intermediate the ends thereof and adapted to bear against the carrier arm, a locking pin adapted to secure said member to a mold and having an annular groove, a ball carried by said member for seating in said groove, said member having internal threads, a plug receivably engaging the internal threads of said member, a spring biased between said plug and said ball for urging the ball into said groove, a headed bolt receivably engaging the internal threads of said member, and a washer engaged on said bolt and forced against the carrier arm upon adjustment of said bolt.

3. The combination of claim 2 and a plug retainer having a recess for receiving one end of said member and locked to said member by said locking pin, said plug retainer bearing against said flange.

4. An attachment for mold carriers having a carrier arm provided with an internally threaded opening, said attachment comprising a cylindrical sleeve including upper and lower end portions, the lower end portion of said sleeve being externally threaded to receivably engage the opening in the carrier arm, a flange integrally formed with said sleeve intermediate the end portions thereof and bearing against the upper surface of the carrier arm, a plug retainer having a recess for receiving the upper end portion of said sleeve, said plug retainer bearing against said flange, said plug retainer and the upper end portion of said sleeve having diametrically opposed, registering openings, a locking pin received in said openings and having an annular groove, a locking ball positioned in said sleeve, said sleeve having internal threads, a plug receivably engaging the internal threads of said sleeve, a coil spring biased between said plug and said ball for urging said ball into said groove, a headed bolt receivably engaging the internal threads of said sleeve, and a washer carried by said bolt and forced against the undersurface of the carrier arm by the head of said bolt.

HARRY J. MORRIS.
LEWEY PETERS.

REFERENCES CITED

The following references are of record in the file of this patent:

UNITED STATES PATENTS

| Number | Name | Date |
|---|---|---|
| 1,502,528 | Reulbach | July 22, 1924 |
| 1,869,249 | Gray et al. | July 26, 1932 |
| 2,365,928 | Allen | Dec. 26, 1944 |